United States Patent [19]

Sörensen

[11] 4,051,044
[45] Sept. 27, 1977

[54] ELECTRIC DISCHARGE SURFACE TREATING APPARATUS

[75] Inventor: Bent Sörensen, Lunderskov, Denmark

[73] Assignee: Softal Elektronik Erik Blumenfeld KG, Hamburg, Germany

[21] Appl. No.: 644,411

[22] Filed: Dec. 29, 1975

[30] Foreign Application Priority Data

Dec. 30, 1974 Germany .................... 2461865

[51] Int. Cl.² ........................ B01K 1/00; H01T 19/04
[52] U.S. Cl. ........................ 250/531; 250/325
[58] Field of Search ............ 219/69 R, 69 M, 69 D, 219/69 V; 250/531, 324–326; 204/164, 165, 168; 427/39, 40

[56] References Cited

U.S. PATENT DOCUMENTS

| 2,969,463 | 1/1961 | McDonald | 250/49.5 |
|---|---|---|---|
| 3,057,792 | 10/1962 | Fröhlich | 204/165 |
| 3,135,676 | 6/1964 | Rothacker | 204/168 |
| 3,157,785 | 11/1964 | Dobson et al. | 250/531 X |
| 3,166,488 | 1/1965 | Makowski | 250/531 |
| 3,182,103 | 5/1965 | Blaylock, Jr. et al. | 264/22 |
| 3,196,270 | 7/1965 | Rosenthal | 250/324 |
| 3,294,971 | 12/1966 | von der Heide | 250/49.5 |
| 3,376,208 | 4/1968 | Wood | 204/168 |
| 3,396,308 | 8/1968 | Whitmore | 317/4 |
| 3,405,052 | 10/1968 | Schirmer | 250/531 |
| 3,483,374 | 12/1969 | Erben | 250/49.5 |
| 3,503,859 | 3/1970 | Goncarovs et al. | 204/165 |
| 3,507,763 | 4/1970 | McBride | 204/169 |
| 3,668,097 | 6/1972 | Eisby | 204/165 |
| 3,669,720 | 6/1972 | Remer | 117/93.31 |
| 3,708,733 | 1/1973 | Bille | 317/262 A |
| 3,959,104 | 5/1976 | Fales | 204/164 |
| 3,973,132 | 8/1976 | Prinz et al. | 250/531 |

FOREIGN PATENT DOCUMENTS

| 827,128 | 11/1969 | Canada | 250/531 |
|---|---|---|---|
| 2,220,886 | 1972 | Germany | |
| 715,914 | 9/1954 | United Kingdom | 117/931 CD |
| 802,254 | 10/1958 | United Kingdom | |
| 933,577 | 8/1963 | United Kingdom | 117/931 CD |
| 1,182,704 | 3/1970 | United Kingdom | 250/531 |
| 1,212,620 | 11/1970 | United Kingdom | 250/531 |
| 1,254,600 | 11/1971 | United Kingdom | |

OTHER PUBLICATIONS

J. C. von der Heide, et al., "Guide to Corona Film Treatment," *Modern Plastics*, pp. 199–206, 344, (May 1961).

*Primary Examiner*—John H. Mack
*Assistant Examiner*—Aaron Weisstuch
*Attorney, Agent, or Firm*—Dale H. Palmatier

[57] ABSTRACT

Apparatus for treating the surface of an object by means of an electrical discharge comprises a cylindrical electrode and a knife electrode, arranged on the same side of the surface to be treated, the knife electrode being tangential to the cylindrical electrode and separated therefrom by a discharge gap through which there is a flow of gas towards the object under treatment.

5 Claims, 2 Drawing Figures

ELECTRIC DISCHARGE SURFACE TREATING APPARATUS

This invention relates to apparatus for treatment of conductive or non-conductive material, e.g., plastics material, paper, metal or cloth, for raising the surface energy of the material by at least one voltage-carrying electrode and a counter-electrode which are arranged on the same side of the material to be treated. The material may be in the form of a strip or moulded body, for example. In one application of the invention, plastics bottles are treated with an electrical discharge to facilitate printing upon them.

In one known apparatus the counter-electrode is formed as a cylindrical electrode and the electrode carrying the voltage as a "knife" electrode. This known device is used for improving the adhesion between a carrier and a plastics film which is in a more-or-less molten state. The knife electrode is inclined to the surface to be treated and is so arranged that the distance of the surface to be treated from the discharge gap is relatively large. A device of that kind may in the application described work satisfactorily. An example is disclosed in German patent specification O/S 1910743, which is substantially the same as British Patent 1,254,600. In many cases, however, the known arrangement is not adequate to give an intensive pretreatment with high efficiency.

Furthermore, special devices have been formed to pretreat bodies which are difficult of access or materials of great thickness. If for example hollow bodies such as bottles or tubes are to be pretreated it is not possible to arrange one electrode on the one side and the counter-electrode on the other side of the wall, as is desirable for good and intensive pretreatment because the best pretreatment takes place in the zone of intensive discharge between the electrodes. With very thick materials treatment between two electrodes is likewise no longer possible since the overall resistance between the electrodes becomes too large. It can also happen that material that is too thick can no longer withstand the high discharge voltage then necessary, so that individual electrical breakdowns occur, damaging the material. This is especially the case if porous materials such as foam are to be pretreated. For treatment of materials of that kind it has already been proposed to arrange both electrodes on one side and to form them as combined bodies, for example, as a cylinder in the surface of which the voltage-carrying electrode is embedded in the form of wires. In practice, a device of this kind has not been entirely successful since the considerable discharge which is necessary for the pretreatment takes place in the cylinder itself and thus an intensive effect upon the surface to be treated was not possible. Furthermore the cylinders heated up very rapidly, whereby poor working life was caused. An example of such an arrangement is shown in German patent specification O/S 2 220 886, which is the same as U.S. application Ser. No. 352,416, filed Apr. 19, 1973, now abandoned.

In apparatus according to the present invention for the treatment of an object of conductive or non-conductive material by raising the surface energy thereof by means of at least one voltage-carrying electrode and one counter-electrode which are spaced from one another by a discharge gap on the same side of the object to be treated, the voltage-carrying electrode is formed as a profiled or knife electrode arranged substantially tangentially to the counter-electrode, which is formed as a cylindrical electrode, and the apparatus comprises means for presenting the object to be heated so that the profiled or knife electrode is substantially parallel with the surface portion of the object under treatment or with the tangent to that surface portion, and means for providing a flow of gas through the discharge gap between the electrodes towards the said surface portion of the object under treatment.

The use of the apparatus defined above permits efficient pretreatment of hollow bodies, shaped bodies and thick materials which by conventional pretreatment between two electrodes could not be pretreated or could be pretreated only with difficulty. Because the profiled or knife electrode is tangential to the surface of the cylindrical electrode the device may be brought very close to the surface to be treated. By subjecting the discharge gap to pressure, it is ensured that sparks and ions which exist in the discharge gap when electrical discharge takes place between the electrodes are carried towards the surface to be treated. The effect on the surface to be treated is that good and intensive treatment takes place.

Advantageously the cylindrical electrode touches the surface to be treated and is either driven itself or is rotated by the motion of the surface to be treated.

The apparatus embodying the invention may be so designed that the cylindrical electrode lies essentially in a closed pressure-chamber and forms the discharge gap together with one wall portion of the chamber, this wall portion being formed by the profiled or knife electrode. In the preferred form of apparatus embodying the invention the cylindrical electrode is exposed through a space in the top wall of the pressure chamber, the lateral portions of the top wall which define the space being constituted by two profiled or knife electrodes which lie essentially in the same tangential plane, each forming with the cylindrical electrode a discharge gap. With this arrangement, two discharge gaps are created with one cylindrical electrode, the discharges in these two gaps simultaneously affecting the surface to be treated. The dimensioning and arrangement of the various components may be such that the discharge takes place practically over the whole exposed zone of the cylinder, though between the discharges to the two electrodes there is in the spark pattern a dark line of separation. The fact that the electrical fields in this arrangement are directed towards one another further assists the action of the spark discharge upon the surface to be treated, since the electrical fields mutually influence each other in such a manner that there is a pattern of the lines of force favourable to action upon the surface.

Although the two knife electrodes in the preferred embodiment lie substantially in a common plane tangential to the cylindrical electrode, in which the surface to be treated or the tangent to it also lies, the profiled or knife electrodes may be arranged with a slight inclination in the direction towards the cylindrical electrode in order to ensure that the surface to be treated can lie unimpeded against the cylindrical electrode.

In tests it has been shown that for the spark discharge the frequency should lie above 10 kHz and the voltage above 5 kV.

In order that the invention may be better understood, one example of apparatus embodying the invention will now be described with reference to the accompanying drawings, in which.

Figure 1:
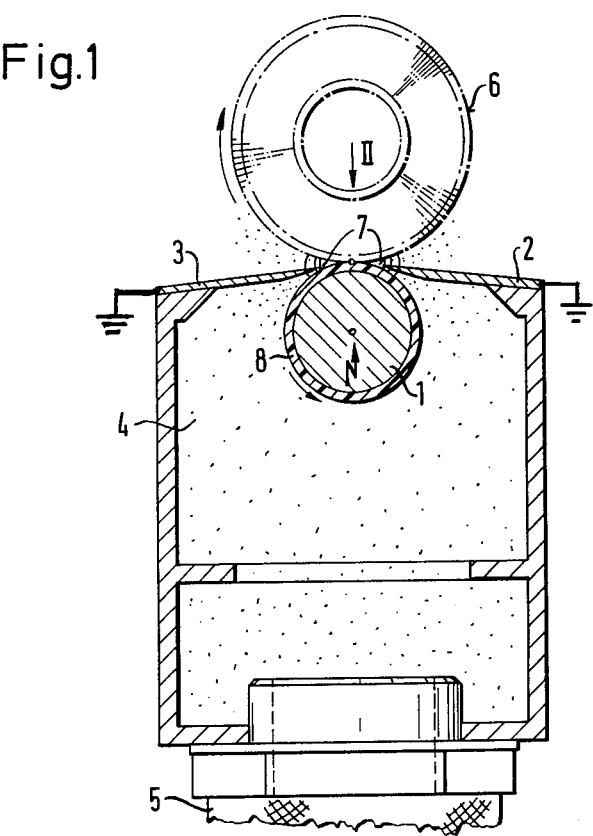
FIG. 1 is a cross-section through apparatus embodying the invention.
Figure 2:
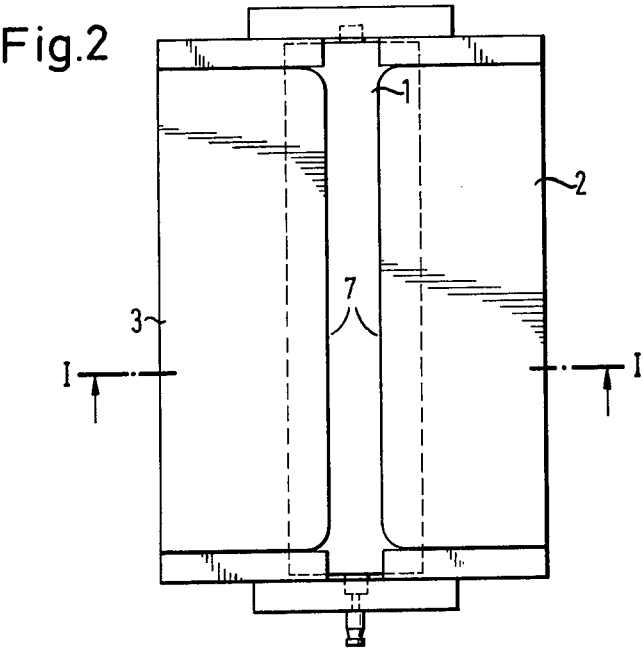
FIG. 2 is a plan view of the device of FIG. 1, from below.

The apparatus illustrated in the drawing includes a cylindrical electrode 1 to which voltage is applied and which is coated with a dielectric 8. The cylindrical electrode 1 lies essentially in a pressure chamber 4, a portion of the cylindrical electrode being exposed through a gap in the top wall of the chamber 4. The gap is defined by two knife electrodes 2 and 3 which together form the said top wall. These knife electrodes are connected to earth. As will be clear from FIG. 1, the two knife electrodes 2 and 3 are essentially tangential to the cylindrical electrode 1. This plane is also the one in which the object 6, illustrated diagrammatically as a hollow body, is treated. For example, in the case of a bottle which is rotated, the cylindrical electrode 1 is turned with it, since the bottle touches the surface of the cylindrical electrode 1. This rotation assists cooling of the cylindrical electrode.

The chamber is supplied with compressed air or other gas under pressure through a pipe 5. This gas leaves the chamber through the discharge gaps 7 and carries the sparks and ions with it in the direction towards the surface to be treated. At the same time the cylinder is cooled by this flow of gas. Since ozone too is generated by the spark discharge this likewise is urged against the surface to be treated. Ozone is advantageous to the surface treatment.

As an example of the application of this invention, bottles or bottle cases are pretreated by the device illustrated and described, so that they may subsequently be printed on. Bottle cases, like bottles or other hollow bodies, pipes or complicated profiles, are accessible only from one side.

Another application in which the apparatus has proved advantageous is the pretreatment of thick foam strips for printing. It has been proved that at treatment speeds up to about 100 m/min inks adhere well with the employment of only one knife electrode.

In tests it has been established that particularly good results were achieved at a frequency in the range about 20 kHz and a voltage between 10 and 15 kV. Moreover it was established in the tests that the intensity of the pretreatment was better with increasing pressure in the pressure-chamber. Tests were performed up to 2500 mm WC (millimeters of water column). In practice it is difficult to exceed this value since otherwise too great a structural outlay must be expended. Although even below 500 mmWC good results have been achieved with moderately priced equipment a range between 1500 and 2500 mmWC has proved particularly advantageous.

I claim:

1. Apparatus for the treatment of the surface of an object of conductive or non-conductive material by raising the surface energy thereof, comprising:
    means defining a first rotatable cylindrical electrode with a surface adapted to lie along the surface of the object, a second knife-like electrode with the edge thereof lying along said surface of said cylindrical electrode in closely spaced relation to define a discharge gap between the electrodes, the knife-like electrode lying substantially tangentially to the cylindrical electrode,
    object-supporting means adapted to maintain such an object in contact with said surface of said first cylindrical electrode, and
    means for providing a flow of gas through the discharge gap between the electrodes.

2. Apparatus as claimed in claim 1, further comprising means defining walls cooperating with the knife-like electrode in defining a closed pressure chamber, the cylindrical electrode lying substantially within the closed chamber, and said knife-like electrode forming a wall portion of the chamber.

3. Apparatus as claimed in claim 2, and including a pair of said knife-like electrodes forming adjacent wall portions of the closed chamber and defining between them a space through which the cylindrical electrode is exposed and each of said knife-like electrodes being substantially tangential to the surface of the cylindrical electrode and being separated therefrom by a discharge gap.

4. Apparatus as claimed in claim 3, in which the knife-like electrodes are arranged obliquely of each other and in a direction convergently toward the cylindrical electrode.

5. Apparatus as claimed in claim 1, including means for supplying to the voltage-carrying electrode an electric waveform the frequency of which lies above 10 kHz and the voltage of which is above 5kV.

* * * * *